(No Model.)

R. HAGEN.
FAUCET ATTACHMENT.

No. 498,788. Patented June 6, 1893.

Witnesses:
M. Regner
William Franklin

Inventor:
Rudolf Hagen
By Smith & Osborn
Attys.

UNITED STATES PATENT OFFICE.

RUDOLF HAGEN, OF SAN FRANCISCO, CALIFORNIA.

FAUCET ATTACHMENT.

SPECIFICATION forming part of Letters Patent No. 498,788, dated June 6, 1893.

Application filed November 17, 1892. Serial No. 452,316. (No model.)

*To all whom it may concern:*

Be it known that I, RUDOLF HAGEN, a citizen of the United States, residing in the city and county of San Francisco, State of California, have invented a new and useful Faucet Attachment, of which the following is a specification.

The object of my invention is to provide a means whereby the valves and working parts of a beer faucet are prevented from becoming fouled when the barrel is being pitched.

My invention consists of a perforated thimble placed over the end of the valve-seat of the faucet, the valves and thimble being operated by a key which brings the ports thereof in line with the ports in the shell or seat or causing said ports to be closed by the thimble or cap.

This invention is an improvement in faucets for which I made application for Letters Patent in the Patent Office on the 26th day of August, 1892, Serial No. 444,149.

Figure 1:
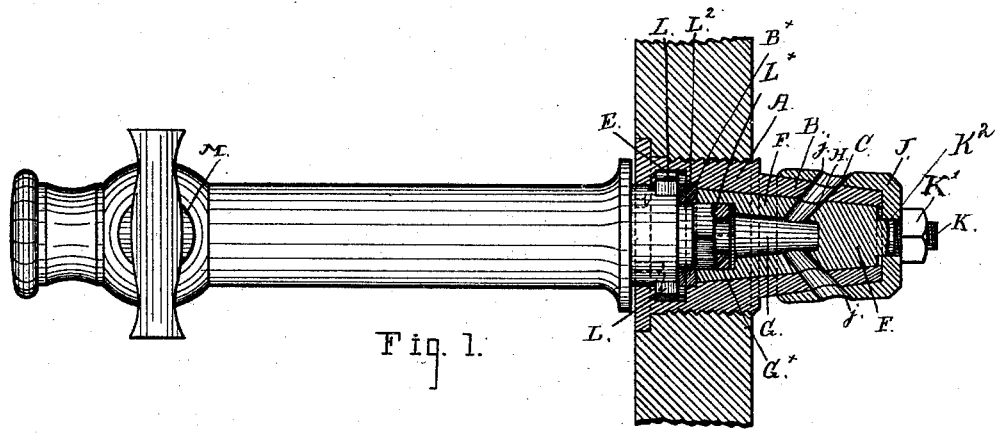
Figure 3:
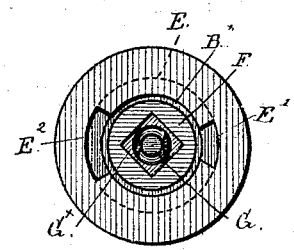
Figure 2:
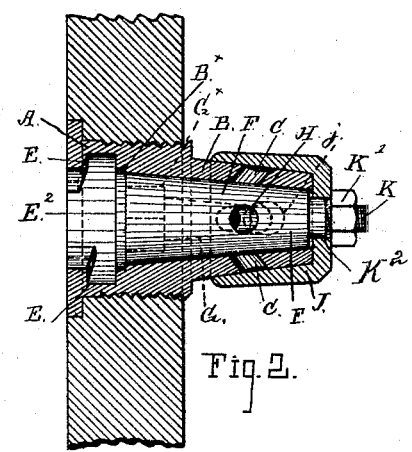
Figure 7:
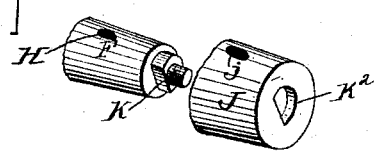
Figure 4:
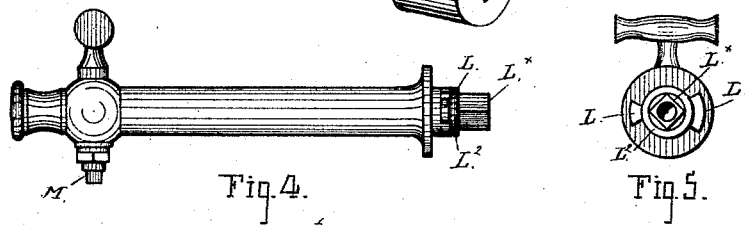
Figure 5:
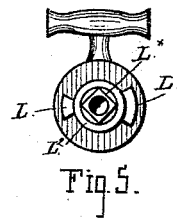
Figure 6:
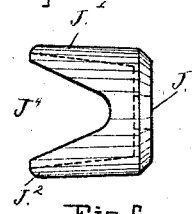

In the accompanying drawings forming part of this specification:—Figure 1 is a vertical longitudinal section through the bushing and valve with the faucet in elevation. Fig. 2 is a vertical longitudinal section through the bushing showing the valve in closed position and the faucet removed. Fig. 3 is a view of the outer end of the bushing. Fig. 4 is a side elevation of the faucet on a small scale. Fig. 5 is a view of the inner end of faucet. Fig. 6 is a view in elevation of a thimble for covering the ports of the faucet during the process of pitching the casks. Fig. 7 is a perspective detail showing the valve and its spindle and the bottom of the thimble with its hole to fit said spindle.

A bushing A screw-threaded in the usual manner has a conical extension or shell B and is at the outer end provided with an inclined groove E which has diametrically opposite openings E' E² intersecting with the groove. Through these openings corresponding lugs on the faucet or key enter the bushing should the faucet be inserted to operate on the valve. The shell B, the internal part of which forms the valve-seat or chamber, has two opposite openings C which incline outwardly and inwardly toward the center of the valve-chamber. A conical valve F fitting closely into the valve-seat is chambered as at G and has two ports H, H, corresponding with the two ports of the shell.

In practice it is the custom to treat all beer kegs with a coating of melted pitch before filling, and in order to protect the ports C of the shell from becoming clogged or fouled with the melted pitch I employ a thimble or cap J closely fitting over the shell B, which during said operation or when the valve is closed covers and shields the ports of the shell, and is also provided with two openings corresponding with the valve-ports H, H.

The valve F ends in a screw-threaded spindle K, which passes through a hole K² in the base of the thimble and a nut K' screwed over the end of the spindle holds the thimble in close contact with the shell B. A short length of the spindle as also the hole K² through the thimble is partly flattened to fit each other, so that by turning the valve the thimble will be turned also and the ports or holes in the valve and in the thimble will always be in the same position toward the ports in the shell B.

Another form of the thimble is shown in Fig. 6 in which parts of the same are cut out to form deep slots J⁴ leaving two arms J' J² which in a closed position of the valve cover the ports of the shell, while the slots thus formed will in an open position of the valve leave uncovered the ports of the shell.

The tap or faucet is of peculiar construction in that it is piped from the inner end to the cock or draw-off plug and is provided with oppositely and outwardly standing lugs L, L, which fit into the groove E of the shell through the openings E' E² and a square key L× formed on the end and packed with a washer L² enters the square chamber G× of the valve and makes a close connection with the ports H, H, of the valve F. The washer L² fitting closely into a recess B× of the valve-seat and against the valve F will form a water tight connection at these points.

The cap or thimble being stationary on the end of the valve, by inserting the key at the end of the tap or faucet in the square or rectangular chamber and giving it a one quarter turn, the ports in the valve and thimble will be brought in line with the ports of the barrel or shell and the liquid will flow through the ports into the pipe of the tap or faucet and pass out through the cock or plug M in continuous manner without interruption.

The ports of both the valve and the shell are made at such an incline as to reduce friction and resistance of the liquid or fluid passing through them to a minimum while the thimble or cap is held to the end of the valve in such a manner that all parts can be readily operated to bring the ports in exact line with each other and cannot be easily unseated. To remove the key and close the valves a further turn of the tap or faucet is given in a backward or reverse direction which closes all of the ports and permits the faucet to be removed through the opposed openings in the rim of the valve-chamber or bushing. The outer end of the same is nearly flush with the head of the cask over which the ordinary revenue stamp is placed and the latter can be mutilated or canceled by the end of the tap.

By this construction a faucet attachment is produced of great convenience and utility with a less number of parts than has hitherto been employed in the production of a perfect working implement of this class.

Having thus described my invention, what I claim, and desire to secure by Letters Patent, is—

1. In a faucet, the combination with a conical shell having opposite ports through its sides: of a valve fitting therein and having a chamber and approximately radial ports leading therefrom and adapted to register with those in the shell, a cock detachably connected with said valve, a spindle projecting from the inner end of the valve, threaded, and flattened on one side, a thimble inclosing the shell and having openings adapted to register with the ports therein, the bottom of the thimble having a hole shaped to closely fit said spindle, and a nut on the latter, as and for the purpose set forth.

2. In a faucet, the combination with a conical shell having opposite ports through its sides: of a valve fitting therein and having a chamber and approximately radial ports leading therefrom and adapted to register with those in the shell, a cock connected with said valve, a spindle projecting from the inner end of the valve, and threaded, a thimble inclosing and fitting closely around the shell and having two oppositely disposed openings adapted to register with the ports therein and set so as to register constantly with the ports in the valve, the bottom of the thimble having a hole fitting over said spindle, and a nut on the latter, as and for the purpose set forth.

In testimony that I claim the foregoing I have hereunto set my hand and seal.

RUDOLF HAGEN. [L. S.]

Witnesses:
C. W. M. SMITH,
CHAS. E. KELLY.